May 31, 1966   D. D. MURPHY   3,253,698
MATERIAL CONVEYING APPARATUS
Original Filed June 5, 1962   3 Sheets-Sheet 1
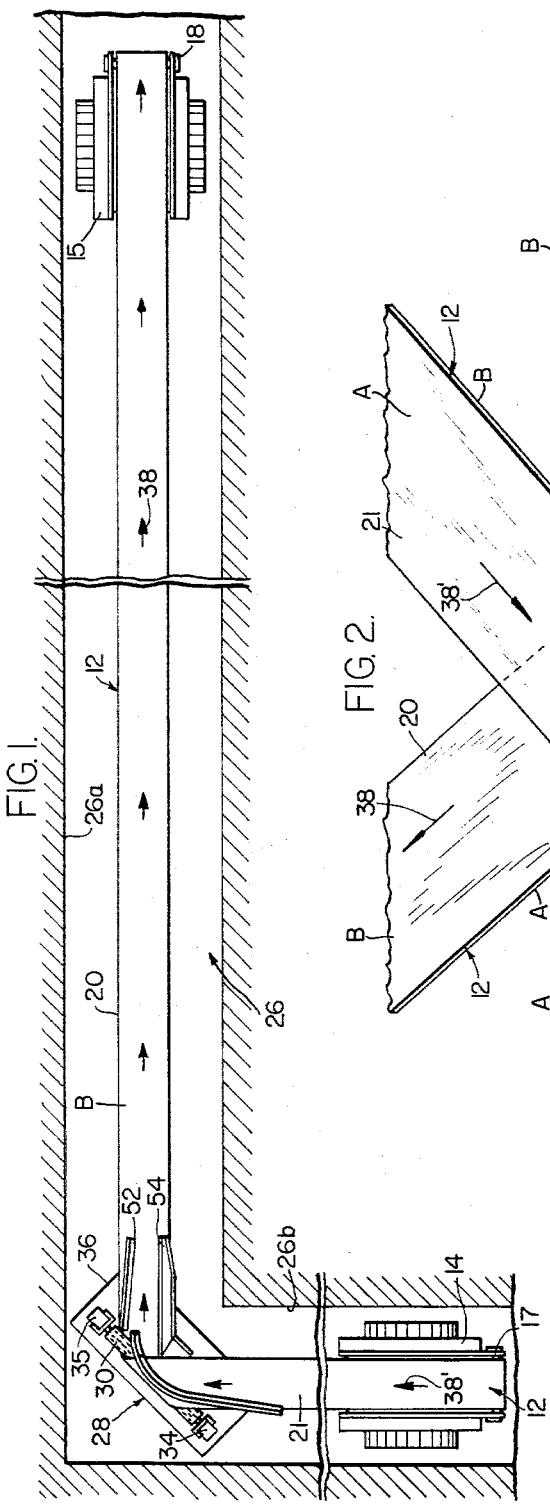
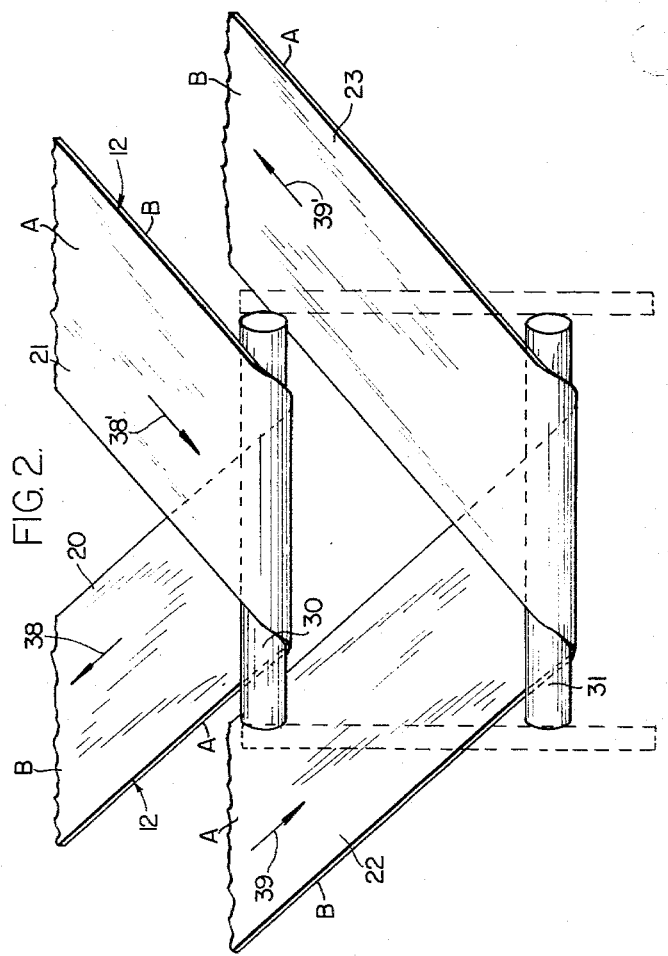
INVENTOR:
DONALD D. MURPHY
BY *Wallace Bewet*
ATTORNEY May 31, 1966  D. D. MURPHY  3,253,698
MATERIAL CONVEYING APPARATUS
Original Filed June 5, 1962  3 Sheets-Sheet 2
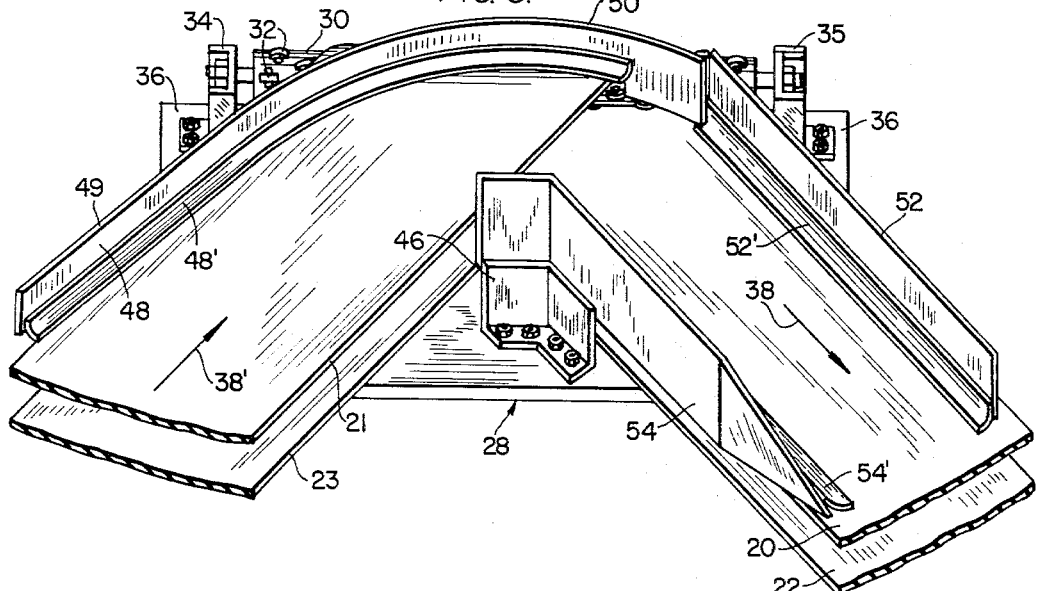
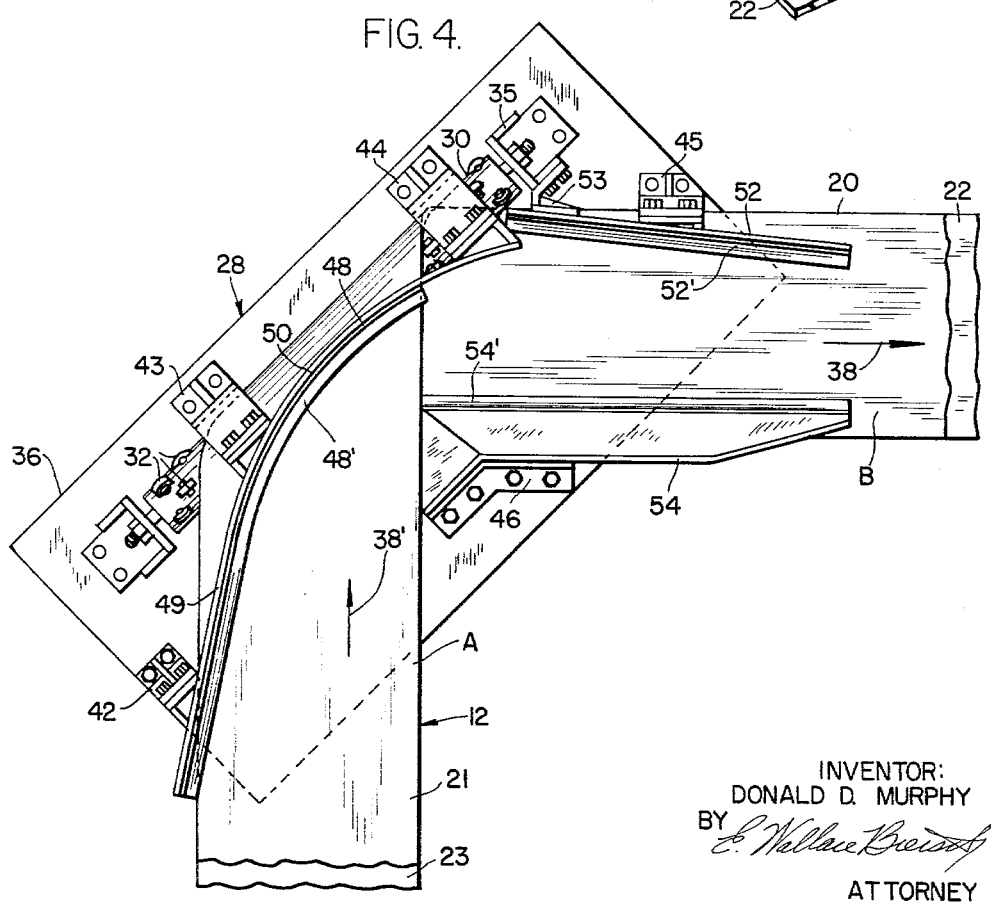
INVENTOR:
DONALD D. MURPHY
BY
ATTORNEY May 31, 1966  D. D. MURPHY  3,253,698
MATERIAL CONVEYING APPARATUS
Original Filed June 5, 1962  3 Sheets-Sheet 3
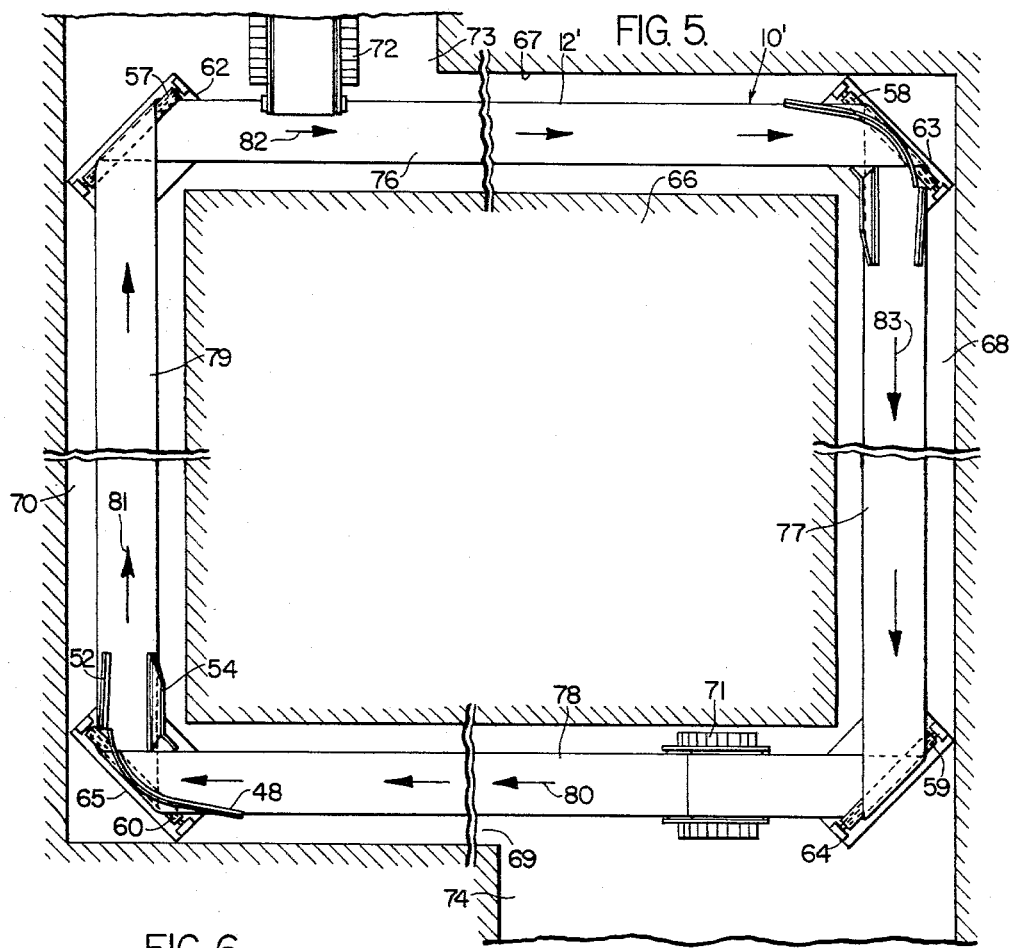
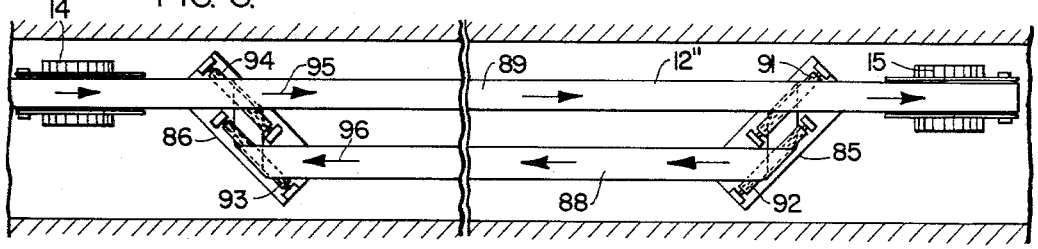
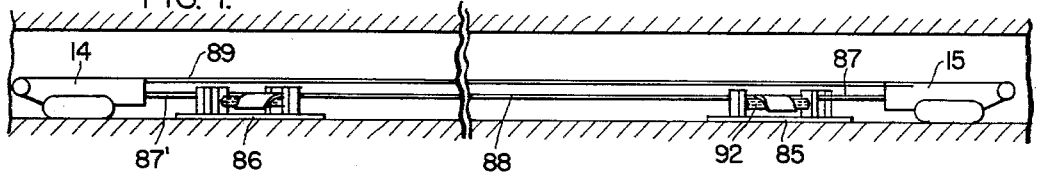
INVENTOR:
DONALD D. MURPHY
BY
ATTORNEY

United States Patent Office 3,253,698
Patented May 31, 1966

3,253,698
MATERIAL CONVEYING APPARATUS
Donald D. Murphy, Franklin, Pa., assignor to Joy Manufacturing Company, Pittsburgh, Pa., a corporation of Pennsylvania
Continuation of application Ser. No. 200,268, June 5, 1962. This application Dec. 18, 1964, Ser. No. 420,858
2 Claims. (Cl. 198—184)

This application is a continuation of application Serial No. 200,268, filed June 5, 1962, now abandoned.

This invention relates to a material conveying apparatus and more particularly to a belt turn device for such material conveying apparatus, which device supports a single elongated endless conveying belt with portions thereof moving angularly with relation to each other.

The use of movable elongated belts for conveying material such as coal is well known and various turn devices have been developed to permit one portion of the belt to discharge material on another portion of the belt, which other portion is angularly disposed with relation to the first portion. Some prior belt turn devices have employed both or either a large number of supporting rollers and rollers located with relation to each other so that a large height is required for their installation. As can readily be appreciated a large number of rollers represents an additional initial and maintenance expense and in many operations turn devices of a large height cannot be employed as there is not sufficient overhead clearance for their installation. Another disadvantage of prior belt turn devices is that the rollers are located with their axes in an angular relationship requiring separate mounting brackets supported by a large mounting base.

As is known, an elongated endless conveyor belt is reversibly bent about two end pulleys at some distance from each other forming the belt into two runs, an upper or conveying run and a lower or return run of the belt. The belt turn device of this invention contemplates the provision of only one additional roller for turning each run of the belt and further provides that where both runs of the belt are to be turned to a new heading simultaneously the axes of the rollers will be in a common vertical plane so that the two rollers can be supported on common mounting brackets requiring a much smaller and more easily portable mounting base than that required by rollers mounted at an angle to each other. Since only two rollers are used the height required for the installation of the belt turn device is substantially less than that required by belt turn devices of the prior art, and obviously the initial and maintenance expense is substantially lower for a two roller device than for one employing three or more rollers as do prior devices.

Accordingly, it is an object of this invention to provide a new and improved material conveying apparatus.

Another object of this invention is to provide a new and improved material conveying apparatus having a single elongated endless conveying belt and provided with a turn device so that portions of the conveying belt move angularly with relation to each other.

It is a further object of this invention to provide a new and improved material conveying apparatus having a single, elongated, endless, conveying belt trained about spaced end pulleys forming the belt into an upper, conveying run and a lower, return run of the belt and provided with a turn device having a single roller for each run of the belt so that each run of the belt is divided into two portions moving angularly with relation to each other.

It is a specific object of this invention to provide a new and improved material conveying apparatus having an elongated, endless, conveying belt and provided with a two-roller turn device so that portions of the belt moving angularly with relation to each other are supported thereby, and having the axes of the two rollers in a common vertical plane.

It is another specific object of this invention to provide a new and improved material conveying apparatus having an elongated, endless, conveying belt trained about a series of single pulley turning devices so that a conveying run of the belt moves along a path horizontally displaced from the path of a return run so that both runs of the belt can be used for transport.

These and other objects of this invention will become more apparent when taken in conjunction with the following detailed description of preferred embodiments thereof, and the following drawings in which:

FIG. 1 is a fragmentary, top plan view of a material conveying system having therein material conveying apparatus constructed according to the principles of this invention;

FIG. 2 is a schematic representative of the material conveying apparatus of this invention;

FIG. 3 is an enlarged perspective view of the material conveying apparatus of this invention;

FIG. 4 is a top plan view of the device shown in FIG. 3;

FIG. 5 is a top plan view of another material conveying system having a plurality of material conveying apparatus of this invention installed in passageways of a mining area, which passageways are shown in horizontal cross section;

FIG. 6 is a top plan view of a third embodiment of the material conveying apparatus of this invention using another arrangement of the single roller turn devices of FIG. 5 installed in a single passageway in a mining area, a portion of which is shown in horizontal section;

FIG. 7 is a side elevational view of the apparatus of FIG. 6.

FIG. 1 illustrates a material conveying system 10 having material conveying apparatus or turn device 28 therein constructed according to the principles of this invention.

As shown the conveying system 10 is employed to transport material in a passageway 26 having portions 26a and 26b angularly disposed with relation to each other as is common in many conveyor system installations such as in transporting of coal underground. The conveying system 10 comprises an elongated endless looped conveyor belt generally indicated at 12, the opposite end loops of which are supported by buggies 14 and 15 respectively. Buggy 15 is a drive and take-up buggy and buggy 14 is a tail buggy as is well known. Buggies 14 and 15 rotatably support end pulleys 17 and 18, respectively, about which the belt 12 is reversely bent in a manner well known in the art forming an upper conveying run and a lower return run. The conveying and return runs of the belt 12 are caused to travel in angularly disposed portions conforming to the angular disposition of the portions 26a and 26b of the passageway 26 by means of the turn device 28. Thus, as is more fully described hereinafter, the conveying run has portions 20 and 21 and the return run has portions 22 and 23 located in the portions 26a and 26b, respectively.

The turn device 28 comprises upper and lower rollers 30 and 31, respectively (see FIG. 2), rotatably mounted in vertically extending brackets 34 and 35 rigidly secured to and supported by a flat, generally rectangular, horizontally extending, base plate 36. The axes of the rollers 30 and 31 lie in a common vertical plane normal to a bisector of the angle formed by the angularly disposed belt portions 20 and 21 or 22 and 23. For the purposes of illustrating this invention, the portions 20 and 21 are perpendicular to each other; however, such difference in direction can be varied to suit the requirements of a particular situation without departing from the principles of this invention.

Although the rollers 30 and 31 are shown as plain cylindrical surfaces in FIG. 2, they are preferably of the type having means to minimize power loss or belt wear such as the roller structure shown and disclosed in U.S. Patent 3,016,127. Thus, rollers 30 and 31 are provided with a plurality of small roller elements 32 rotatably mounted on the rollers 30 and 31.

The directions of travel of the portions 20 and 21 of the conveying run are shown by the arrows 38 and 38', respectively, so that the buggy 14 and the pulley 17 constitute the material receiving end of the belt 12 and the buggy 15 and the end pulley 18 constitute the delivery end of the belt 12. The arrows 39 and 39' (see FIG. 2) show the directions of travel of the portions 22 and 23 of the return strand whereby the return strand is travelling from the end pulley 18 to the end pulley 17, about both of which the belt 12 is reversely bent so that the conveying run travels from the pulley 17 to the pulley 18. As can be seen in FIG. 2 the portion 21 travels over the top surface of the roller 30 and being bent thereabout at an angle to its axis travels outward therefrom at a lower level to form the portion 20. Simultaneously, the portion 22 travels underneath the pulley 31 and, being wrapped thereabout at an angle, is elevated and travels outwardly from the top surface of the pulley 31 to form the portion 23. Thus the conveying run travels over and under roller 30 and the return run travels under and over the roller 31.

Rigidly, removably, secured to the base plate 36 is a plurality of upwardly extending, horizontally spaced, bracket members 42 through 46, three of which bracket members 42, 43, and 44 extend upwardly somewhat above the upper roller 30 and are rigidly, removably, secured to an elongated, vertically disposed, horizontally extended guide plate 48 positioned with its bottom edge upwardly adjacent the top surface of the portion 21 of the belt 12. Plate 48 has a straight portion 49 and a curved portion 50 positioned so that the end of the straight portion 49 remote from the roller 30 along portion 21 is outwardly adjacent the left-hand edge of the angularly disposed portion and extends therefrom across the portion 21 at an angle of some 10 or 20° with the edge of the belt. The straight portion 49 blends into the curved portion 50 which extends the remaining transverse distance across the portion 21 and a short distance along the portion 20 of the belt 12 to guide material being conveyed toward the roller 30 by the portion 21 transversely across the portion 21 on the right-hand side (as viewed in FIG. 4) and discharges the conveyed material to the portion 20. The bracket member 45 extends upwardly to a position somewhat above the portion 20 to support a straight, flat, vertically disposed, horizontally extended, guide plate 52 which is also rigidly secured to a bracket member 53 removably secured to the roller brackets 35 so that the guide plate 52 is held in position to guide the conveyed material onto the conveying portion 20. In like manner the bracket 46 rigidly supports a similar guide plate 54 positioned along the opposite side of the conveying portion 20 to prevent conveyed material from spilling over the near edge of the main conveying portion 20. All of the guide plates 48, 52, and 54 are provided with elongated flexible edge pieces 48', 52', 54', respectively, along their bottom edges which edge pieces have a curved cross section and extend downwardly from the guide plates 48, 52 and 54 to contact the upper belt surfaces to assure the proper direction of conveyed material flow.

Operation of the material conveying apparatus of this invention begins when suitable operation of suitably powered drive pulleys (not shown) puts the conveyor belt 12 into orbital motion in the path described about the pulleys 17 and 18. For purposes of explanation the top surface of the portion 21 is designated as surface A while the under surface of the same portion of the belt is designated as surface B (see FIG. 2). With the belt operating in the direction indicated material to be conveyed, hereinafter designated as coal, is deposited on the surface A of the belt at or near the end pulley 17 and travels with the belt in the direction 38' in an entirely conventional manner until the coal reaches the guide plate 48. The coal impinges along the inner surface of the guide plate 48 and is guided thereby to travel transversely across the belt portion 21 until it falls off the right-hand edge as viewed in FIG. 1 and descends to the portion 20 and is thereafter conveyed in the direction shown by the arrows 38 until discharge over the end pulley 18. It is to be noted that the surfaces S and B of the belt 12 in travelling around the pulley 30 are reversed so that in the main conveying run 20, the surface B is uppermost with the coal lying thereupon as it is conveyed the remaining distance. One of the advantages conferred by the apparatus of this invention resides in the use of both surfaces of the belt for conveying purposes, thus dividing the wear between the two belt surfaces A and B and substantially increasing the life of the belt. When the belt is reversely bent around the end pulley 18, the surfaces are again reversed so that in the portion run 22, the surface A is uppermost and the surface B is on the bottom (see FIG. 2). The portion 22 passes under the roller 31 and being angularly, reversely, bent thereabout becomes portion 23, with the surface B uppermost and the surface A on the bottom, which is reversely bent around the end pulley 17 to become the portion 21 of the conveying run.

It is to be noted that turn device 28 of this invention utilizes only two parallel rollers in the place of three or more rollers associated with turn devices of the prior art. Using only two rollers reduces both the first cost and the maintenance cost of such a device and makes possible the use of a smaller base plate 36 than that required by devices of the prior art. Fewer pulleys also results in lower belt tension and reduced horsepower requirements because less power is lost in maintaining belt tension and in bending the belt about the pulleys. The simplified belt turn device of this invention also requires less height for its installation which is an important consideration where thin seams of coal are being mined and extra roof height may be very costly to procure. Since the turn device is smaller, more compact and lighter, it is more readily portable when the necessity arises for moving it to some other operative position. Training of the belt is also simplified since the position of the rollers 30 and 31 is easily determined by positioning them with their axes in a vertical plane normal to a line bisecting the angle formed by the center line of the two angularly related portions of the passageway 26.

FIG. 5 shows another embodiment of the material conveying apparatus of this invention which comprises an elongated endless belt 12' trained about four horizontally spaced angularly disposed rollers 57, 58, 59 and 60, similar to the rollers 30 and 31 described in relation to the first embodiment, and mounted on single roller turn devices 62, 63, 64 and 65, respectively. These turn devices 62 through 65 are shown positioned adjacent the corners of a rectangle, respectively, but should be considered as adaptable to positioning at the corners of any straight sided figure such as a trapezoid, or a triangle or pentagonal figure if more or less turn devices are used. A rectangular area of FIG. 5 is depicted as an unmined portion 66 of a mineral vein formed and surrounded by passageways 67, 68, 69, 70, progressing clockwise about the rectangle, produced in the mineral vein by mining operations. The belt 12' is provided with a suitable drive and take-up buggy 71 which provides driving power and tensioning for the belt 12'. Two of the belt turn devices 63 and 65, located on diagonally opposite corners of the rectangle 66, are entirely similar to the belt turn device 28 of the first embodiment including guide plates 48, 52, and 54, excepting only that these are single roller devices rather than the double roller device of the first embodiment. The other two turn devices 62 and 64 are similar to those just described excepting that the guide plates 48, 52 and 54 have been omitted from these devices. In FIG. 5 there is shown a portion of the delivery end of a mining machine 72 located in an enlarged mined out portion of the mineral vein, at the junction of passageways 67 and 70, hereinafter designated the production area 73. At the junction of the passageways 68 and 69 is shown another enlarged mined out portion hereinafter designated as the entry area 74 and is to be considered as the portion by which this section of the mining operation communicates with older mined out portions of the mining operation. Angularly disposed portions of the conveying run of the belt 12' are indicated as portions 76 and 77, with the portion 76 beginning adjacent the mining machine 72 and the production area 73 and ending at the turn device 63; and portion 77 of the conveying run extending from the turn device 63 along passageway 68 to the turn device 64 adjacent the entry area 74 of the mined out area. A first portion 78 of the return run begins at the turn device 64 and extends along the passageway 69 to the turn device 65 where another portion 79 of the return run angularly disposed with relation to the first portion 78 extends from the turn device 65 to the turn device 62 adjacent the production area 73 whereat the next portion of the belt 12' is the first portion 76 of the conveying run.

Operation of the second embodiment of this device begins with suitable drive pulleys (not shown) mounted in the drive and take-up buggy 71 driving the belt 12' in a manner well known in the art. The belt 12' circulates about the unmined portion 66 in the direction shown by the arrows 80 through 83 and is turned about the corners of the block in a manner entirely similar to the turning of the belt 12' of the first embodiment, with a reversal of belt surfaces in the same manner as hereinbefore described. With the belt operating, coal produced in the production area 73 is deposited upon the conveying run portion 76 by the mining machine 72 and is conveyed along the portions 76 and 77 in the manner described for the first embodiment. Upon reaching the turn device 64 the coal travels over the roller 59 and is deposited upon the floor of the entry area 74 or upon another conveyor (not shown) which carries it away as part of the general production of the mine in a manner well known in the art. With the belt operating in the direction indicated, supplies present in the entry portion of this mining area, such as tools and the like, can be placed upon the return run portion 78, carried around the corner by the device 65, along the return run portion 79, and travelling over the roller 57, will be deposited in the production area 73 to be used as desired.

This second embodiment has an advantage over the embodiment first described in that both the return run and the conveying run of the conveyor 12' are usuable at the same time with a further advantage in lower height and greater portability of the turn devices 62 through 65 attributable to the fact that these are single roller turn devices as compared to the two roller turn devices of the first embodiment.

A third embodiment of the material conveying apparatus of this invention is shown in FIGS. 6 and 7 and is very similar to the second embodiment in that turn devices 85 and 86 employed in this embodiment are only one roller high, but these devices 85 and 86 differ from those of the second embodiment in that each device has two rollers with parallel axes in a common horizontal plane and have no guide plates at all. An elongated endless conveyor belt 12" is trained about these devices in such manner that a return run of the conveyor belt 12" has two portions 87 and 87' underneath and vertically aligned with a conveying run 89 and an intermediate third portion 88 of the return run laterally displaced from the conveying run 89 by the use of turn devices 85 and 86, as hereinafter described, so that the portion 88 of the return run can be used for supply transport in the same manner as the return run portions of the second embodiment. The conveying run 89 travels from left to right in FIG. 6 as shown by an arrow 95 and the return run 88 travels in the opposite direction as indicated by an arrow 96.

The turn device 85 has a roller 91 angularly disposed beneath the conveying run 89 at an angle of approximately 45° to the direction of travel indicated by the arrow 95. Horizontally spaced from the roller 91 in a direction normal to the direction of travel is a second roller 92 of the turn device 85 rotatable about an axis parallel to the axis of roller 91 and in the same horizontal plane. In like manner two rollers 93 and 94 are mounted on the turn device 86 with roller 94 underneath the conveying run 89 and the roller 93 laterally spaced therefrom in the same direction as the roller 92 is spaced from roller 91. As shown in FIGS. 6 and 7 the belt 12" is angularly bent about the rollers 91, 92, 93 and 94 travelling over and then under roller 91, under and then over roller 92, over and then under roller 93 and finally under and then over roller 94. This method of reeving the return run portions 87, 88, 87' about the rollers can be varied to encompass different patterns, such as over and then under each of the rollers 91 through 94, with just one stipulation which is that in all reeving patterns the return run portion 88 must travel over the top of roller 93 before turning and travelling under it.

Operation of the third embodiment of this invention is essentially the same as that described for the second embodiment with coal produced in an area adjacent the tail buggy 14 travelling along the conveying run in the direction shown by the arrow 95 and supplies deposited on the belt portion 88 near the roller 92 travelling in the direction indicated by the arrow 96 and passing over the roller 93 to be deposited on the floor of the passageway 90 near the tail buggy 14. The third embodiment has the advantage of being usable in a single somewhat wider passageway 90 rather than the multiple passageways required for the second embodiment and has the further advantage of utilizing only the two turn devices 85 and 86 rather than the four separate turn devices needed in the second embodiment.

Preferred embodiments of this invention having been described and illustrated it is to be realized that modifications thereof may be made without departing from the broad scope of this invention. Accordingly, it is respectfully requested that this invention be interpreted as broadly as possible and be limited only by the prior art.

What I claim is:

1. In a belt conveyor system for conveying material continuously along a first straight path and a second straight path of travel intersecting in plan, the combination comprising an endless belt having a first outer surface and an opposite outer surface underlying said first surface, said first surface constituting the conveying run of said first straight path, a rotatable roller extending transversely of said first path to define the end of said first path and the beginning of said second path, said roller extending at an acute angle with reference to a plane extending perpendicularly to the direction of travel of said belt as it approaches said roller, said belt being reeved over and under said roller whereby said opposite outer surface is disposed upwardly from said first outer surface and constitutes the conveying run of said second path, and means located adjacent said roller for effecting displacement of material from said first outer surface of said belt onto said opposite outer surface thereof.

2. In a belt conveyor system for conveying material continuously along a first straight path and a second straight path of travel intersecting in plan, the combination comprising an endless belt having a first outer surface and an opposite outer surface underlying said first surface, said first surface constituting the conveying run of said first straight path, a first rotatable roller mounted on a support and extending transversely of said first path to define the end of said first path and the beginning of said second path, said roller extending at an acute angle with reference to a plane extending perpendicularly to the direction of travel of said belt as it approaches said first roller, said belt being reeved over and under said first roller whereby said opposite outer surface is disposed upwardly from said first outer surface and constitutes the conveying run of said second path, means located adjacent said roller for effecting displacement of material from said first outer surface of said belt onto said opposite outer surface thereof, a second rotatable roller mounted on said support and underlying said first roller with the rotational axis thereof being parallel to the rotational axis of said first roller, and said belt having a return run portion being reeved under and over said second roller whereby said return run underlies said conveying run.

References Cited by the Examiner

UNITED STATES PATENTS

| | | | |
|---|---|---|---|
| 2,212,006 | 8/1940 | Buchanan | 198—182 X |
| 2,222,019 | 11/1940 | Buchanan | 198—187 X |

FOREIGN PATENTS

| | | |
|---|---|---|
| 1,258,707 | 6/1960 | France. |
| 867,517 | 2/1953 | Germany. |
| 636,388 | 4/1950 | Great Britain. |
| 641,885 | 8/1950 | Great Britain. |
| 42,728 | 2/1938 | Netherlands. |

SAMUEL F. COLEMAN, *Primary Examiner.*

EDWARD A. SROKA, *Examiner.*